United States Patent
Kim et al.

(10) Patent No.: US 9,857,502 B2
(45) Date of Patent: Jan. 2, 2018

(54) METHOD OF FABRICATING FILM OF SUBSTRATE AND FILM, BACKLIGHT UNIT AND LIQUID CRYSTAL DISPLAY USING THE SAME

(75) Inventors: Myung Jun Kim, Seoul (KR); Yun Gu Kang, Seoul (KR); Myoung Soo Ahn, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 604 days.

(21) Appl. No.: 14/344,039

(22) PCT Filed: Sep. 9, 2011

(86) PCT No.: PCT/KR2011/006742
§ 371 (c)(1),
(2), (4) Date: Mar. 28, 2014

(87) PCT Pub. No.: WO2013/035911
PCT Pub. Date: Mar. 14, 2013

(65) Prior Publication Data
US 2015/0160375 A1   Jun. 11, 2015

(51) Int. Cl.
*G02B 1/04* (2006.01)
*F21V 8/00* (2006.01)
(Continued)

(52) U.S. Cl.
CPC ............ *G02B 1/04* (2013.01); *C08L 33/14* (2013.01); *C09D 133/14* (2013.01); *F21K 9/60* (2016.08);
(Continued)

(58) Field of Classification Search
None
See application file for complete search history.

(56) References Cited

U.S. PATENT DOCUMENTS

| 5,898,041 A | 4/1999 | Yamada et al. |
| 2005/0007757 A1* | 1/2005 | Leu .................. G02B 6/0065 362/615 |

(Continued)

FOREIGN PATENT DOCUMENTS

| CN | 1160864 A | 10/1997 |
| CN | 101561529 A | 10/2009 |

(Continued)

OTHER PUBLICATIONS

International Search Report in International Application No. PCT/KR2011/006742, filed Apr. 17, 2012.
(Continued)

*Primary Examiner* — Anthony J Frost
(74) *Attorney, Agent, or Firm* — Saliwanchik, Lloyd & Eisenschenk

(57) ABSTRACT

Provided is a method of fabricating a thick film of a large area substrate. The method of fabricating comprises applying a first rein on a base substrate to form a rein partition, and applying a second resin on an inner area formed by the resin partition.
According to the present invention, by forming a first partition formed with resin when a film of a large area is coated and then by coating the film, uniformity and reliability of the coating can be improved.

17 Claims, 4 Drawing Sheets

(51) Int. Cl.
    *G02F 1/1335*   (2006.01)
    *C09D 133/14*   (2006.01)
    *C08L 33/14*    (2006.01)
    *F21K 9/60*     (2016.01)
    *B29K 33/00*    (2006.01)

(52) U.S. Cl.
    CPC ......... *G02B 6/0055* (2013.01); *G02B 6/0065* (2013.01); *G02F 1/133615* (2013.01); *B29K 2033/08* (2013.01); *B32B 2457/202* (2013.01); *G02B 6/0053* (2013.01)

(56) References Cited

U.S. PATENT DOCUMENTS

| | | | | |
|---|---|---|---|---|
| 2006/0203347 | A1* | 9/2006 | Yang | G02B 5/0215 359/599 |
| 2008/0049324 | A1* | 2/2008 | Murakami | C08L 1/10 359/489.02 |
| 2008/0255264 | A1* | 10/2008 | Hong | C08G 18/672 522/96 |
| 2010/0097552 | A1* | 4/2010 | Shinya | C09J 109/00 349/122 |
| 2010/0134879 | A1* | 6/2010 | Yoshihara | B32B 27/30 359/361 |
| 2010/0149463 | A1* | 6/2010 | Shimizu | G02F 1/13394 349/106 |
| 2010/0171900 | A1* | 7/2010 | Lee | G02B 6/0051 349/58 |
| 2010/0182541 | A1* | 7/2010 | Ouchi | G02F 1/133615 349/65 |
| 2010/0246208 | A1* | 9/2010 | Iwasaki | G02B 6/0041 362/582 |
| 2013/0335672 | A1 | 12/2013 | Hur et al. | |

FOREIGN PATENT DOCUMENTS

| | | |
|---|---|---|
| CN | 100576077 C | 12/2009 |
| CN | 101652804 A | 2/2010 |
| CN | 101932968 A | 12/2010 |
| GB | 2459888 A | 11/2009 |
| GB | 2468875 A | 9/2010 |
| GB | 2474365 A | 4/2011 |
| JP | H01242631 A | 9/1989 |
| JP | 2003-126760 A | 5/2003 |
| JP | 2004-311353 A | 11/2004 |
| JP | 2006-063144 A | 3/2006 |
| JP | 2006260912 A | 9/2006 |
| JP | 2007-007639 A | 1/2007 |
| JP | 2008545260 A | 12/2008 |
| JP | 2014505970 A | 3/2014 |
| KR | 1020030035850 A | 5/2003 |
| KR | 200361394 Y1 | 9/2004 |
| KR | 1020060123965 A | 12/2006 |
| KR | 1020070109555 A | 11/2007 |
| KR | 1020080021993 A | 3/2008 |
| KR | 10-2008-0092729 A | 10/2008 |
| KR | 10-2008-0019216 A | 9/2010 |
| KR | 10-2011-0068833 A | 6/2011 |
| TW | 200717098 A | 5/2007 |
| TW | I299746 B | 8/2008 |
| TW | 201009449 A | 3/2010 |
| WO | WO-2007/138294 A1 | 12/2007 |
| WO | WO-2008139973 A1 | 11/2008 |
| WO | WO-2011/025174 A2 | 3/2011 |
| WO | WO-2011/056026 A2 | 5/2011 |

OTHER PUBLICATIONS

Office Action dated Aug. 13, 2012 in Korean Application No. 10-2012-0050874.
Office Action dated Dec. 9, 2014 in Japanese Application No. 2014-529598.
Office Action dated Jun. 12, 2015 in Chinese Application No. 201180073360.9.
Office Action dated Apr. 27, 2016 in Chinese Application No. 201180073360.9.
Office Action dated Feb. 20, 2014 in Taiwanese Application No. 100132838.
Office Action dated Jun. 12, 2015 in Chinese Application No. 201180073360.9, filed May 14, 2014.
Extended European Search Report in International Application No. PCT/KR2011/006742, filed Apr. 17, 2012.
Dr. Janglin, "Flexible Displays Development in Taiwan", Industrial Technology Research Institute, Mar. 17, 2011, XP055189672.
Anonymous, "Flexible and patterned LED backlights enable novel applications—LEDs" LEDS Magazine, Feb. 28, 2006, XP055189714, pp. 1-7.
Anandan, M, "LED backlight Enhancement of picture quality on LCD screen", 9th Asian Symposium on Information Display (Asid), New Dehli, India; Journal of the Society for Information Display; Oct. 8, 2006, pp. 130-134, XP002562074.
Office Action dated Nov. 11, 2016 in Chinese Application No. 201180073360.9.

* cited by examiner

METHOD OF FABRICATING FILM OF SUBSTRATE AND FILM, BACKLIGHT UNIT AND LIQUID CRYSTAL DISPLAY USING THE SAME

CROSS-REFERENCE TO RELATED APPLICATIONS

This application is the U.S. national stage application of International Patent Application No. PCT/KR2011/006742, filed Sep. 9, 2011, the disclosure of which is incorporated herein by reference in its entirety.

TECHNICAL FIELD

The present invention relates to a film coating method of a large area substrate and the film configuration.

BACKGROUND ART

Recently, as home appliances of a liquid crystal display are enlarged, an application process of a specific rein layer on a large area substrate is enlarged, and as a result there concerns about uniform application of the resin layer and reliability thereof as essential factor.

In a prior fabricating process of a film on a large area substrate, as shown FIG. 1, a metal jig M is formed on a base substrate 10 and a film coating material is applied inside the metal jig M and cured, and then the metal jig M is removed.

However, in this process, as shown in FIG. 2 taken in line of A-A' of FIG. 1, in a case where a film coating material 20 is applied inside a metal jig M, a predetermined gap G occurs due to a surface tension of the coating material itself and thereby decreasing a coating uniformity. Further, the metal jig of an essential frame is to be consumed and thus it may increase cost of the fabricating process and in a case where the metal jig M is detached after a curing process of the coating material, burs may produced on a surface of the coating material due to friction between the coating material and the metal jig. Additionally, in an environment of a large-scaled detaching process, much time and labor need.

Specially, in order to overcome the surface tension, there has been proposed an idea that a thickness of the coating material is thickened overall wherein a larger area than an effective area is printed and then the metal jig is removed and cut. However, burs occur due to the cutting process and a product is damaged due to a stress caused during the cutting process, and thereby degrading the product.

DISCLOSURE OF INVENTION

Technical Problem

The present invention has been proposed to solve the above drawbacks and an object of the present invention relates to provide Further, another object of the present invention relates to provide a back light unit and a liquid crystal display using the back light unit in which a tensile strength, reliability of constant temperature and humidity, and heat-resistant reliability are ensured in the products and degree of freedom is increased in the back light unit by thinning entire thickness of a back light unit.

Solution to Problem

According to an embodiment of the present invention, a method of fabricating a film of a large area substrate is provided, comprising a first step of applying a first resin on a base substrate to form a resin partition, and a second step of applying a second resin on an inner area formed by the resin partition.

The first step comprises applying resin and curing or semi-curing the resin to form a closed-space with upper part being opened along a boundary of the base substrate.

The second step comprises applying the second resin of same material as the first resin and curing it.

A film of a large area substrate fabricated by the method comprises a resin layer formed on a base substrate wherein the resin layer comprises a first resin portion formed on a boundary of the resin layer and a second resin portion formed inside the first resin portion, and in this case the first resin portion and the second resin portion are made of same material and a transparency degree A of the first resin portion is lower than that B of the second resin portion.

A backlight unit fabricated using the film of a large area substrate comprises a plurality of LED light sources formed on a print circuit board on which a reflection film is laminated, a diffusion plate on which an optical pattern for shielding light emitted from the LED light source is printed, and a resin layer to be laminated on the LED light source, which is formed as a film of claim 11 for guiding forward emitted light.

Furthermore, A liquid crystal display using a side view LED as a light source is provided, comprising a resin layer including a first resin portion and a second resin portion, which are laminated to receive the light source, and a back light unit provided with a diffusion plate on an upper portion of the resin layer, on which an optical pattern is formed.

Advantageous Effects of Invention

According to the present invention, a first partition made of resin is formed when a film of a large area is coated and then the film is coated and thereby improving uniformity and reliability of the coating.

Specially, in case where the resin structure according to the present invention is used as a light guide plate of a backlight unit, by removing the light guide plate and guiding a light source using a resin layer of a film type, the number of the light sources may be reduced and a total thickness of a backlight unit can be thinned and thereby increasing a freedom degree of a product.

In addition, in the backlight unit a side view LED is mounted directly downward to decrease significantly the number of a light source and ensure optical characteristics. Meanwhile, by removing a light guide plate, the backlight unit may be applied to a flexible display and further a reflection film provided with a reflection pattern and a diffusion plate provided with a light shielding pattern are provided on a resin layer to ensure stable optical characteristics.

BRIEF DESCRIPTION OF DRAWINGS

The above and other aspects, features and advantages of certain exemplary embodiments of the present invention will be more apparent from the following description taken in conjunction with the accompanying drawings, in which.

REFERENCE NUMERALS

Mode for the Invention

Figure 1:
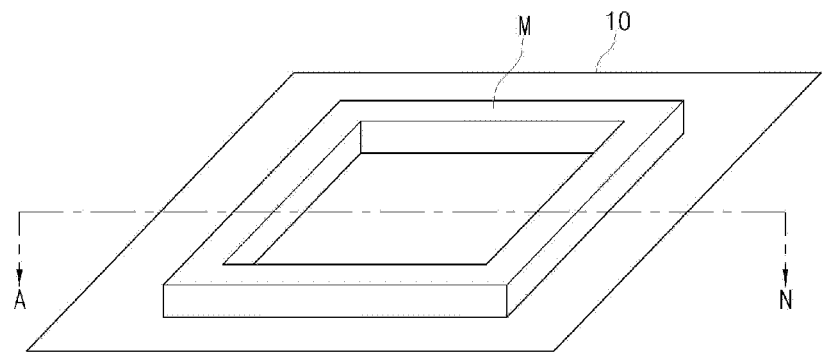
FIGS. 1 and 2 are views schematically illustrating an coating method of a film on a large area substrate, respectively, according to a prior art.
Figure 2:
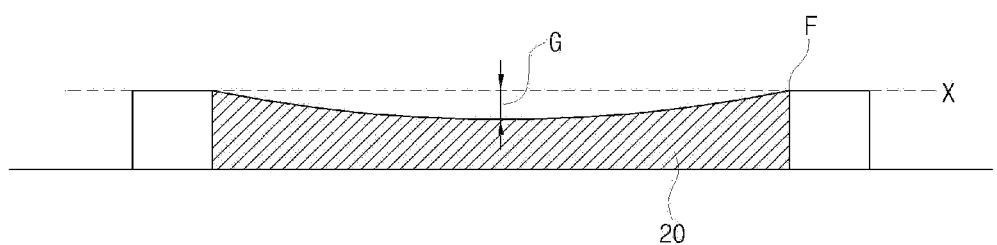

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

A gist of the present invention relates to provide a technology that when a film of a large area substrate is coated, without using a metal jig, a partition configuration formed with resin is made first and then coated, and thereby increasing a coating uniformity and reliability thereof.

Figure 3:
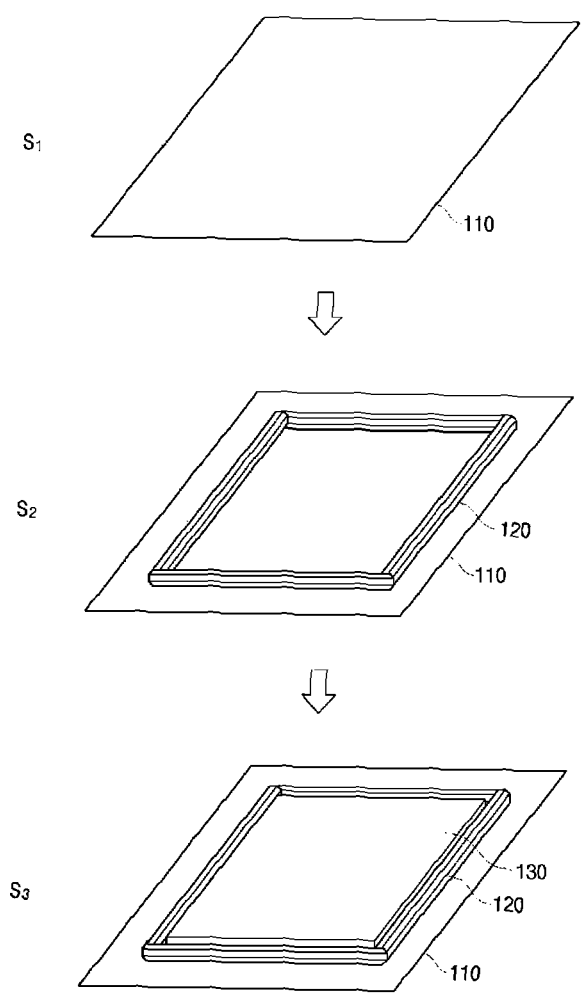
FIG. 3 is a view illustrating a forming method of a film on a large area substrate according to the present invention.

FIG. 3 is a view illustrating a forming method of a film on a large area substrate according to the present invention. Referring to FIG. 3, the forming method of a film on a large area substrate may include a first step S1-S2 of forming a resin partition 120 by applying a first resin on a base substrate 110 and a second step S3 of applying a second resin 130 on an inner portion surrounded by the resin partition 120.

Specially, in the first step, the resin may be applied to form a closed-space with upper part being opened along a boundary of the base substrate and cured or semi-cured, and the second rein may be applied. Furthermore, the first resin forming the resin partition 120 may be the same material as the second resin 130. Even though the material of the first resin is not limited to same material of the second resin, in a case where a film is formed by using same material of the first and second resins, an adhering reliability of the first and second resins may be increased and thereby increasing uniformity and solving flatness error caused from a surface tension.

Specially, after applying the first resin on a base substrate in the first step, by curing the base substrate through a light-curing or UV curing method and then applying the second rein thereon, a film is formed wherein in a case where the second resin is applied, the base substrate is cured again through a light-curing or UV curing method, and in this case the respective resins have different transparencies even though they are made of same material.

Figure 4:
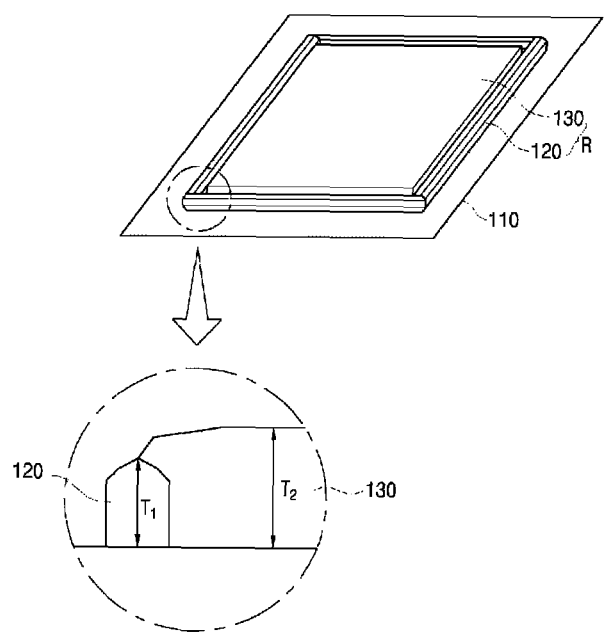
FIG. 4 is a view illustrating a configuration of a film formed according to the present invention.

With respect to a configuration of a film of a large area substrate formed according to the present invention, referring to FIG. 4, a resin layer R may be provided on a large area substrate 110 wherein the resin layer R may include a first resin portion 120 formed on an edge of the base substrate and a second resin portion 130 formed inside the first resin portion. Specially, the first and second resin portions may be formed with same or different material and in this case a transparency A of the first resin portion appears to be lower than that B of the second resin portion due to an exposure frequency in a fabricating process. This means that a haze of the second resin portion is higher than that of the first resin portion.

Further, a thickness T2 of the second resin portion of a film of a large area substrate according to the present invention may be made equal to or more than that T1 of the first resin portion. Furthermore, the second resin portion may include bead for increasing light reflection and in a case where the bead is used, instead of a light guide plate of a backlight unit, it may include the bead of 0.01-0.3%, based on a total weight of the first resin portion.

Meanwhile, the first and second resin portions may be formed with a thermosetting or photo curing resin, and as one example, they may be formed with synthetic resin comprising urethane acrylate oligomer. Further, in a case where the first and second resin portions are used, instead of a light guiding plate of a backlight unit, a resin layer may be formed mainly with resin mainly of urethane acrylate oligomer. For example, the resin layer may be formed with urethane acrylate oligomer of synthetic oligomer, which is blended with a polymer type of poly acryl. Of course, it may further comprise a monomer blended with a low boiling point diluted-type reactive monomer of IBOA (isobornyl acrylate), HPA (Hydroxylpropyl Acrylate) and 2-HEA (2-hydroxyethyl acrylate), and further a photoinitiator (for example, 1-hydroxycyclohexyl phenyl-ketone) or antioxidant as additives. With respect to a combination ratio of resin forming the resin layer made of a synthetic resin comprising a mixture of oligomer and polymer resin, a composition of the mixture of oligomer and polymer resin 20-42%, monomer 30-63%, and additives 1.5-6% may be used.

In this case, the oligomer and polymer resin may be a mixture of urethane acrylate oligomer 10-21% and poly acryl 10-21%. Furthermore, the monomer as a low boiling point diluted-type reactive monomer may be formed with IBOA (isobornyl acrylate) 10-21%, HPA (Hydroxylpropyl Acrylate) 10-21% and 2-HEA (2-hydroxyethyl acrylate) 10-21%. The additives may be formed with a photoinitiator 1-5% for initiating photo reaction and antioxidant 0.5-1% for improving yellowish phenomenon.

By forming a resin layer of UV resin using the composition as described above on a backlight unit, which will be described later in FIG. 5, instead of the light guide plate, the same effects as the prior light guide plate can be obtained and further a refraction rate and a thickness of the back light unit can be adjusted. At the same time, by using the composition to complement a drawback of an oligomer type such as surface tension decreasing, mass production speed decreasing due to long time period curing of a ploygomer type can be solved to satisfy all of an adhering property, reliability and mass production speed.

Specially, the resin layer according to the present invention may be preferably formed through the following processes.

That is, the resin layer according to the present invention may be mainly formed by blending urethane acrylate oligomer with poly acryl of a polymer type and be mainly-reacted in an UV curing wavelength of 300-350 μm or in a wavelength of 400 μm using mercury lamp or metal (gallium) lamp, and when the polymer type is cured, $N_2$ is inputted to adjust a curing balance with a general oligomer type and thus the resin layer is flexible and has excellent adhering force, and a limitation of the light guide plate by keeping a refraction rate of PMMA (polymethymethacrylate) is overcame.

As described in the forgoing, with respect to fabricating a large area substrate, by forming a partition using resin when a large area is coated, and then coating same material to form entire resin layer, a fabricating process can be simple and cost can be saved and flatness of a film can be ensured and further bur creating can be avoided to improve a product quality.

Figure 5:
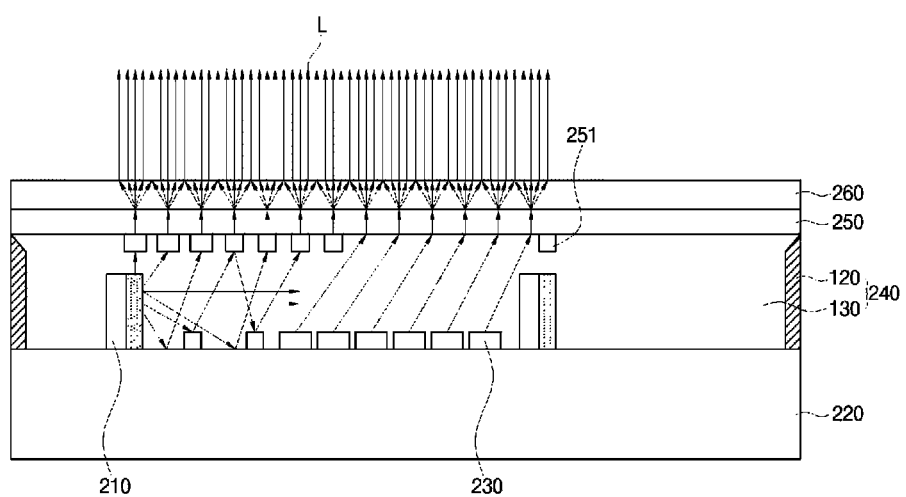
FIG. 5 is a view illustrating a backlight unit provided with a film configuration according to the present invention.

FIG. 5 is a view illustrating a backlight unit configured using the film of a large area substrate according to the present invention. Through the back light unit as shown in FIG. 5, light is emitted laterally from the side view LED 210 and is reflected from the resin layer, which is formed instead of a prior light guide plate, and diffused wherein a reflection rate is increased further through the reflection film 220 and the reflection pattern 230 to guide forward the light. Here, the light passing through the resin layer 240 is diffused or shielded through the diffusion plate formed on the diffusion plate 250 and the purified-light L is incident to a LCD panel as white-light through an optical sheet such as a prism sheet 260. The resin layer 240 may include a first resin portion 120 and a second resin portion 130 to ensure a flatness of a film for diffusing light reliably, instead of a prior light guide plate. In this case, the second resin portion may include bead, as described in the forgoing.

Here, the reflection pattern 230 may have a reflection material for diffusing light emitted from a light source and may be formed through a white printing method for promoting a light diffusion. In more detail, the reflection pattern may be printed using a reflection ink comprising any one of $TiO_2$, $Al_2O_3$.

Furthermore, the optical pattern 251 may serve to diffuse the light emitted through the resin layer 240 and the optical pattern 251 may be formed as a light shielding pattern to prevent optical characteristics from being degraded due to an excessively strong light intensity, or preventing light from being yellowish, so that a light shielding effect may be partially implemented. That is, the light shielding pattern may be printed using the light shielding ink so that concentration of light does not occur. The optical pattern 251 may be formed through a printing on an upper surface of a lower surface of the diffusion plate 250, and more preferably it may be arranged in a light emission direction (forward direction) from the LED light source 210 disposed at a lower portion of the diffusion plate. That is, the optical pattern may be disposed on a place of the diffusion plate, corresponding to a vertical upper surface of the LED light source or a light emission direction surface. In more detail, the optical pattern according to the present embodiment may be formed on a lower surface of the diffusion plate in a light emission direction through a superposition printing structure of a diffusion pattern formed using a light shielding ink comprising one or more of $TiO_2$, $CaCo_3$, $BaSO_4$, $Al_2O_3$, and silicon and a light shielding pattern formed using a slight shielding ink comprising Al or a mixture of Al and $TiO_2$.

As described in the forgoing, in a case where a back light unit is fabricated using a film of a large area substrate, by removing a light guide plate and providing a side view LED as a light source and further by guiding light through reflection and diffusion through a resin layer according to the present invention, the back light unit can be thinned and the number of a light source can be decreased. Meanwhile, brightness decreasing and uniformity problems caused from the number decreasing of light source can be supplemented by the reflection pattern, the light shielding pattern and the diffusion pattern and thereby implementing picture uniformity.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A film of a light unit, comprising;
   a resin layer disposed on a base substrate of the light unit; and
   a resin wall disposed on the base substrate and around the resin layer,
   wherein the resin wall has an open region in which the resin layer is disposed,
   wherein a maximum thickness of the resin wall is smaller than a thickness of the resin layer with respect to an upper surface of the base substrate,
   wherein the resin wall includes an inner surface in contact with an outer lateral surface of the resin layer, an outer surface opposite to the inner surface, and a top surface opposite to the upper surface of the base substrate between the inner surface and the outer surface;
   wherein the top surface of the resin wall includes a first surface in contact with an outer portion of the resin layer,
   wherein the first surface of the top surface of the resin wall has a sloped surface and is overlapped with the outer portion of the resin layer in a vertical direction,
   wherein each of the resin wall and the resin layer comprises a mixture of urethane acrylate oligomer and polymer resin, monomer, and additives;
   wherein a haze of the resin layer is higher than a haze of the resin wall, and
   wherein the resin layer has more transparency than a transparency of the resin wall.

2. The film of claim 1, wherein the resin layer comprises a different material than the resin wall.

3. The film of claim 1, wherein the resin wall comprises beads for increasing light reflection,
   wherein the beads comprise 0.01-0.3 wt % of the resin wall.

4. The film of claim 1, wherein each of the resin wall and the resin layer comprises 20-42% of the mixture of urethane acrylate oligomer and polymer resin, 30-63% of the monomer, and 1.5-6% of the additives.

5. The film of claim 1, wherein the monomer is a mixture of 10-21% of IBOA (isobornyl acrylate), 10-21% of HPA (Hydroxylpropyl Acrylate), and 10-21% of 2-HEA (2-hydroxyethyl acrylate).

6. The film of claim 1, wherein the resin layer comprises a photoinitiator and an antioxidant.

7. A backlight unit, comprising;
   a printed circuit board
   a plurality of LED light sources and a reflection film formed on the printed circuit board;
   a film disposed on the reflection film so that the plurality of LED light sources are embedded;
   a diffusion plate on the film; and
   an optical pattern disposed under the diffusion plate and configured to shield light emitted from the LED light sources;
   wherein the film comprises a resin layer on the reflection film, and a resin wall disposed on the reflection film and around the resin layer;
   wherein the resin wall has an open region in which the resin layer is disposed,
   wherein a maximum thickness of the resin wall is smaller than a thickness of the resin layer with respect to an upper surface of the reflection film, wherein the resin wall includes an inner surface in contact with an outer lateral surface of the resin layer, an outer surface opposite to the inner surface, and a top surface opposite to the upper surface of the reflection film between the inner surface and the outer surface;

wherein the top surface of the resin wall includes a first surface in contact with an outer portion of the resin layer, wherein the first surface of the top surface of the resin wall has a sloped surface and is overlapped with the outer portion of the resin layer in a vertical direction, wherein each of the resin wall and the resin layer comprises a mixture of urethane acrylate oligomer and polymer resin, monomer, and additives;

wherein a haze of the resin layer is higher than a haze of the resin wall, wherein the resin layer has more transparency than a transparency of the resin wall, wherein the LED light sources includes a first LED light source and a second LED light source spaced apart from the first LED light source, wherein the first LED light source and the second LED light source emit light in the same direction, wherein the first LED light source emits light toward the second LED light source, wherein the optical pattern is disposed in the resin layer, and wherein a portion of the optical pattern is overlapped with the first LED light source in the vertical direction.

8. A liquid crystal display, comprising:
a back light unit according to claim 7.

9. The backlight unit of claim 7, wherein the reflection film comprises a reflection pattern, and wherein the reflection pattern and the LED light sources are embedded in a lower portion of the resin layer, and
wherein a bottom of the optical pattern is closer to the first LED light source than to a top surface of the resin layer.

10. The backlight unit of claim 7, wherein the optical pattern is disposed in an upper portion of the resin layer, and
wherein a bottom of the optical pattern is closer to the first LED light source than to a top surface of the resin layer.

11. The backlight unit of claim 9, wherein a gap between constituents of the reflection pattern disposed between the first LED light source and the second LED light source decreases from the first LED light source to the second light LED source.

12. The backlight unit of claim 7, wherein a bottom surface of the resin layer has a smaller area than an area of a top surface of the resin layer, and
wherein the bottom surface of the resin layer has a horizontal plane.

13. The backlight unit of claim 7, wherein a width of the resin wall is smaller than the maximum thickness of the resin wall with respect to an upper surface of the reflection film, and
wherein the width of the resin wall is a distance between the inner surface and the outer surface of the resin wall.

14. The backlight unit of claim 7, wherein the film directly contacts a top surface and a plurality of lateral surfaces of the first LED light source.

15. The film of claim 1, wherein the top surface of the resin wall has a second surface which is disposed between the outer surface of the resin wall and an apex of the resin wall,
wherein the second surface of the top surface of the resin wall has a sloped surface, and
wherein a bottom surface of the resin layer has a smaller area than an area of the top surface of the resin layer.

16. The film of claim 15, wherein the bottom surface of the resin layer and a bottom surface of the resin wall directly contact the upper surface of the base substrate, and
wherein the bottom surface of the resin layer has a horizontal plane.

17. The film of claim 1, wherein a width of the resin wall is smaller than the maximum thickness of the resin wall with respect to an upper surface of the base substrate, and
wherein the width of the resin wall is a distance between the inner surface and the outer surface of the resin wall.

* * * * *